V. Draper,
Making Ornamental Chains,
No. 2,063, Reissued Sept. 5, 1865.
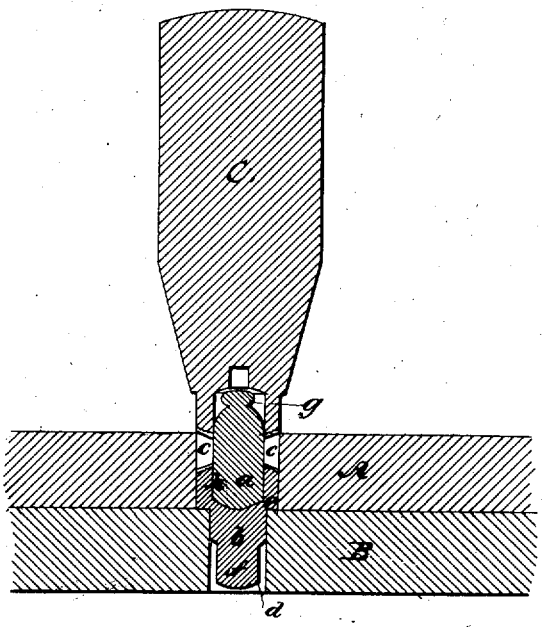
Witnesses.
D. P. Hale Jr
Frederick Curtis
Inventor.
Virgil Draper
by his attorney.
R. H. Eddy

UNITED STATES PATENT OFFICE.

OSCAR M. DRAPER, OF NORTH ATTLEBOROUGH, MASS., ASSIGNEE OF VIRGIL DRAPER.

IMPROVEMENT IN DIES FOR STAMPING RINGS.

Specification forming part of Letters Patent No. 42,907, dated May 24, 1864; Reissue No. 2,063, dated September 5, 1865.

*To all whom it may concern:*

Be it known that VIRGIL DRAPER, of North Attleborough, in the county of Bristol and State of Massachusetts, have invented a new and useful Improvement in Dies or Mechanism for Swaging or Stamping Metallic Chain Links or Rings, and, having assigned the said invention to me, OSCAR M. DRAPER, now, therefore, I do declare the same to be fully described in the following specification and represented in the accompanying drawing, which denotes a vertical section of the apparatus complete.

The nature of my invention consists in the combination of a separate centering-piece, with the punch and the dies, constituting a mechanism for swaging chain-links or blanks therefor for the purpose of finishing and ornamenting them.

In the said drawing, A and B are two plates of steel, one of which, viz., A—is placed on the other. A cavity or hole, *c*, to correspond with the outside form of the link to be swaged, is made through the upper plate, A. There is also a cylindrical socket, *d*, made through the part B. The socket *d* receives a separate bed-die, *b*, which is formed not only with a shoulder, *e*, to rest on the plate B, but has a tenon, *f*, extending downward from it, and being of a size to enter a socket, *g*, made in a punch, C. The lower surface of the punch C, as well as the upper surface of the bed-die *b*, may or are to be engraved or enchased with the proper devices to be stamped on a ring when placed within the space *c*. The said punch C at its lower part is to fit the cavity or chamber *c* or correspond with it in diameter, and, furthermore, is to be provided with the cylindrical cavity *g* to receive a separate centering-piece, *a*, which, when in place within the cavity *g*, projects from and beyond it, as shown in the drawing. There is also in the bed-die *b* a cavity, *h*, for reception of the centering-piece *a*, which may be removed therefrom at pleasure.

From the above it will be seen that the parts A B C and *a* and *b* are made separate from one another. In operating with them, a chain ring or link to be swaged is first to be placed within the cavity *c*. Next the punch is to be forced or driven down upon the ring with great power, so as to compress the ring between it and the die *b* and around the center piece, *a*, and not only finish the circumference of the ring by spreading it laterally against the sides of the cavity or matrix *c*, but produce on the sides of the ring the necessary ornamentation or figures. After this has been accomplished it becomes necessary to remove the ring from the matrix *c* and the centering-piece *a*.

The separation of the ring from the matrix *c* can be accomplished by forcing the bed-die *b* upward so as to drive the ring out of the matrix by a lever or other suitable means.

In its movements out of the cavity *c* the ring will take with it or adhere to the centering-piece *a*, which afterward may be readily separated from the ring by driving the centering-piece out of the ring or the ring off the centering-piece.

Were the centering-piece *a* fastened to the bed-die *b*, or were they made in one piece of metal, or were it fastened to the punch C, it would be difficult to remove the ring from the centering piece after the operation of swaging the said ring had been effected, because the condensation of the ring by the punch would cause it to adhere so closely to the centering-piece *a* as to render it no easy matter to separate the two without doing injury to the ring. Furthermore, the separate or removable centering-piece enables the die to which it may belong to be cut or engraved to better advantage than would be the case were the centering-piece either fastened to or made in one piece with the die.

By removing the centering-piece from the die the engraver can get at the die to better advantage, whether to cut or repair it, and particularly can cut or form the inner edges of the die or those parts of it immediately surrounding the centering-piece, when in place, with the requisite sharpness, which he cannot do without far greater trouble were the centering-piece fastened to the die. Thus it will be seen that one object of the separate or removable centering-piece is to enable the die to be cut, engraved, or repaired to better advantage than would be the case were the centering-piece not removable from the die.

Therefore it will be seen that the separate or removable centering-piece *a*, applied to and used as above described, in connection with the punch C, the bed-die *b*, and the mold-plates A and B constitute an important improvement in dies for swaging chain-links or articles of like character.

I claim as my invention—

The combination of the separate removable centering-piece *a* with the punch C, the die *b*, and the mold-plates A and B, or their mechanical equivalent, the whole being substantially as specified.

O. M. DRAPER.

Witnesses:
R. H. EDDY,
F. P. HALE, Jr.